United States Patent
Yang et al.

(10) Patent No.: US 11,064,837 B2
(45) Date of Patent: Jul. 20, 2021

(54) CERAMIC PELLET GRILL

(71) Applicants: Hongwei Yang, Jiangsu (CN); Xuemei Yao, Anhui Province (CN)

(72) Inventors: Hongwei Yang, Jiangsu (CN); Xuemei Yao, Anhui Province (CN)

( * ) Notice: Subject to any disclaimer, the term of this patent is extended or adjusted under 35 U.S.C. 154(b) by 186 days.

(21) Appl. No.: 16/267,351

(22) Filed: Feb. 4, 2019

(65) Prior Publication Data
US 2020/0046163 A1 Feb. 13, 2020

(51) Int. Cl.
| | | |
|---|---|---|
| *A47J 37/07* | (2006.01) | |
| *A47J 36/04* | (2006.01) | |
| *F24B 13/04* | (2006.01) | |
| *F24B 1/20* | (2006.01) | |
| *F24B 1/22* | (2006.01) | |

(52) U.S. Cl.
CPC ........... *A47J 36/04* (2013.01); *A47J 37/0718* (2013.01); *A47J 37/0759* (2013.01); *A47J 37/0763* (2013.01); *F24B 1/207* (2013.01); *F24B 1/22* (2013.01); *F24B 13/04* (2013.01); *F23B 2700/013* (2013.01)

(58) Field of Classification Search
CPC .... A47J 36/04; A47J 37/0718; A47J 37/0759; A47J 37/0763; A47J 37/0623; A47J 37/07; A47J 37/0754; F24B 1/207; F24B 1/22; F24B 13/04; F24B 1/202; F23B 2700/013
USPC ............. 126/25 R, 29, 10, 11, 275 R, 7, 501
See application file for complete search history.

(56) References Cited

U.S. PATENT DOCUMENTS

| | | | | |
|---|---|---|---|---|
| 4,526,158 A | * | 7/1985 | Lee ...................... | A47J 37/0763 126/25 A |
| 4,619,209 A | * | 10/1986 | Traeger ..................... | F23B 1/30 110/104 R |
| 4,823,684 A | * | 4/1989 | Traeger ............... | A47J 37/0704 126/10 |
| 4,862,795 A | * | 9/1989 | Hawkins ............. | A47J 37/0709 99/446 |

(Continued)

FOREIGN PATENT DOCUMENTS

WO  WO-2018208919 A1 * 11/2018  .......... A47J 37/0786

OTHER PUBLICATIONS

"16267351, Google Search 2020-11-12.pdf", online google search, Nov. 12, 2020.*

(Continued)

*Primary Examiner* — Steven B McAllister
*Assistant Examiner* — Daniel E. Namay
(74) *Attorney, Agent, or Firm* — Loza & Loza, LLP; Heidi Eisenhut

(57) ABSTRACT

A pellet grill includes a ceramic oven body and a ceramic inner liner. The oven body includes a first through-hole in its side. A conduit is inserted through the first through-hole into the oven body. A firepot is removably coupled to the conduit toward an end of the conduit that is within the oven body. The inner liner conforms to a shape of, and fits to a portion of, an oven body inner wall. The inner liner covers the conduit and includes a second through-hole aligned with the firepot. A bulge in the inner liner conforms to a shape of the conduit within the ceramic oven body and may protect the conduit from cooking debris and from heat, rising from a flame in the firepot, that circulates within a portion of the oven body that is above the inner liner. The firepot receives fuel and air via the conduit.

20 Claims, 11 Drawing Sheets

(56) References Cited

U.S. PATENT DOCUMENTS

| | | | | |
|---|---|---|---|---|
| 5,313,877 | A * | 5/1994 | Holland | A47J 37/0704 126/25 R |
| 6,488,025 | B1 * | 12/2002 | Cunningham | F24C 3/006 126/519 |
| 7,644,711 | B2 * | 1/2010 | Creel | F24B 1/192 126/80 |
| D714,090 | S | 9/2014 | Harper | |
| 9,504,353 | B1 * | 11/2016 | Benson | A47J 37/07 |
| 10,070,754 | B2 * | 9/2018 | Schlosser | A47J 37/0704 |
| 2007/0047166 | A1 * | 3/2007 | Creel | F24B 1/192 361/118 |
| 2009/0136885 | A1 * | 5/2009 | Manno | B27H 5/08 432/37 |
| 2010/0095946 | A1 * | 4/2010 | Creel | F24B 1/192 126/25 R |
| 2011/0048398 | A1 * | 3/2011 | Christensen | F23B 10/00 126/77 |
| 2011/0073101 | A1 * | 3/2011 | Lau | F23K 3/14 126/501 |
| 2011/0283990 | A1 * | 11/2011 | Walters | A47J 37/0759 126/25 R |
| 2012/0266856 | A1 * | 10/2012 | Zelek | A47J 37/067 126/25 R |
| 2016/0327263 | A1 * | 11/2016 | Traeger | F24C 1/04 |
| 2017/0176018 | A1 * | 6/2017 | Traeger | F24B 15/005 |
| 2017/0336076 | A1 * | 11/2017 | Walters | F24C 3/025 |
| 2018/0325314 | A1 * | 11/2018 | Walters | A47J 37/0786 |
| 2018/0368619 | A1 * | 12/2018 | Boyd, Sr. | A47J 37/0704 |
| 2019/0059652 | A1 * | 2/2019 | Kohli | A47J 37/0786 |
| 2019/0069721 | A1 * | 3/2019 | Walters | F24B 1/024 |
| 2019/0290066 | A1 * | 9/2019 | Colston | F24B 15/005 |
| 2019/0293295 | A1 * | 9/2019 | Colston | F24B 1/16 |
| 2019/0387924 | A1 * | 12/2019 | Zheng | A47J 37/0713 |
| 2020/0015628 | A1 * | 1/2020 | Fitzgerald | A47J 37/0759 |
| 2020/0158337 | A1 * | 5/2020 | Baker | F23B 40/08 |
| 2020/0170448 | A1 * | 6/2020 | Baker | A47J 37/0786 |

OTHER PUBLICATIONS

Black Olive Pellet Grill, Owners Manual, Sherwood Industries Ltd., Dec. 10, 2012.

Black Olive Grill. (www.http://blackolivegrill.com/products). Downloaded Jul. 30, 2020.

Pellet Grill. (www.http://blackolivegrill.com/products). Downloaded Jul. 30, 2020.

Charcoal Grill—Black Olive Grill. (www.http://blackolivegrill.com/products). Downloaded Jul. 30, 2020.

* cited by examiner

CERAMIC PELLET GRILL

PRIORITY CLAIM

This application claims priority to and the benefit of, Chinese Patent Application No. 201821832915.9, filed on Nov. 8, 2018 in the National Intellectual Property Administration of the People's Republic of China, the entire content of which is incorporated by reference herein as if fully set forth below in its entirety for all applicable purposes.

FIELD

The present disclosure generally relates to a barbeque and more particularly to a ceramic pellet grill.

BACKGROUND

Existing pellet combustion furnaces are generally applied in the field of industry for power generation and commercial and residential heating. However, pellet combustion furnaces have not been widely accepted for cooking. As cooking is part of daily life, it follows that use of a pellet furnace have not been applied directly in daily life.

A popular form of cooking is barbeque cooking, where meat, fish, or other food is cooked on a rack (e.g., a cooking grid) over an open fire or over a heat source on a purpose-designed barbecue grill. Barbecuing is generally but not necessarily, performed out of doors. Heat for grilling on existing barbecue grills is typically generated by burning charcoal (e.g., charcoal combustion) or employing electromagnetic power.

The existing method of charcoal combustion offers pure taste, but involves the emission of carbon monoxide (an odorless gas that is deadly if inhaled) and also may cause certain harm to human body, for example if lighter fluid is used to start charcoal combustion, volatile organic compounds can be released leaving petroleum residue on the grilled food and possibly in a barbeque chef's lungs. Additionally, charcoal-fired barbeque grills are known to have a problem of insufficient combustion of charcoal, and thus poor burning efficiency. Electromagnetic power offers poor taste, which is generally attributed to the lack of a smoky flavor and an inability to finely regulate the temperature of the heat used to grill the food. For example, electromagnetic power generators for barbeque grilling are usually set to predetermined energy levels (e.g., high, medium, and low) by non-continuous multi-level thermostatic controls. Additionally, even when pellets are used as a heat source for grilling, the structures used to feed the pellet furnace with pellets and combustion air may become dirty from foods dropped on and oils dripped on the devices. Moreover, these devices are exposed to the high temperatures used in barbecue grills and therefore may be subject to corrosion and degradation resulting from their exposure to the high temperatures.

There is therefore a need for a pellet fed grilling device that protects the structures used to feed the pellets and supply the combustion air into a pellet furnace (e.g., a firepot, a combustion receptacle) and that can continuously regulate temperature and have a high degree of burning efficiency.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to one exemplary embodiment, a ceramic pellet grill may include a ceramic oven body with a first through-hole in a side of the ceramic oven body, a conduit inserted through the first through-hole into the ceramic oven body, a firepot suspended within the conduit toward an end of the conduit that is within the ceramic oven body, and a ceramic inner liner within the ceramic oven body. The ceramic inner liner may be configured to fit to an inner wall of the ceramic oven body, be placed on an upper surface of the conduit, be equipped with a second through-hole aligned with the firepot, and provided with a bulge, where a shape of the bulge is matched to a shape of the conduit within the ceramic oven body.

According to some example, the ceramic pellet grill may also include an auger, within the conduit, having a first end external to the ceramic oven body and a second end coupled to the firepot, the auger may extend from the first end to the second end of the conduit. The ceramic pellet grill may also include a hopper coupled to the first end, to store pellets and to feed the pellets to the first end of the auger, an electric motor at the first end, coupled to the auger, to rotate the auger, where rotation of the auger by the electric motor conveys pellets from the hopper into the firepot via the auger, and a built-in igniter within the firepot.

In some ways, the outer contour of the ceramic inner liner may correspond to an inner contour of an inner wall of the ceramic oven body and may be releasably coupled to the inner wall of the ceramic oven body. The ceramic pellet grill may also include a fan configured to force combustion air from outside of the ceramic oven body into the firepot via the conduit, a thermostatic control device in electrical communication with the electric motor coupled to the auger and the fan, configured to control combustion of the pellets in the firepot and regulate heat in the ceramic oven body above the ceramic inner liner, a drip pan, above and distinct from the ceramic inner liner, wherein the drip pan is configured to collect drippings from food on a cooking grid above the drip pan and to distribute the drippings to a holding receptacle, and a flame tent located below the drip pan and aligned with the firepot below the drip pan, to evenly distribute heat from flame generated by combustion of the pellets in the firepot. In one example, the ceramic pellet grill can also include an igniter switch, where the igniter switch is electrically coupled to the built-in igniter (mentioned above) and the igniter switch is located at a lower side of the conduit outside the ceramic oven body.

The ceramic pellet grill may also include a fan configured to force combustion air from outside of the ceramic oven body into the firepot via the conduit, to promote pellet combustion by controlling a speed of the fan.

In one operational example, the ceramic pellet grill may include a ceramic oven cover that covers a top of, and couples to, the ceramic oven body, an outer edge of the ceramic oven cover configured to correspond in shape and size to an outer edge of the ceramic oven body and may further include a support frame configured external to the ceramic oven body and below the outer edge of the ceramic oven body. In one example, a top of the support frame is about 5-8 mm below the outer edge of the ceramic oven body. Furthermore, in some situations, the ceramic pellet grill may also include a fixture positioned at a bottom of the ceramic oven body, where the end of the conduit that is within the ceramic oven body is supported by the fixture to ensure that an open top of the firepot is adjacent to and aligned with the second through-hole of the ceramic inner liner. Still further the inner wall of the ceramic oven body may expand by about 2-3 mm at a top of the ceramic oven body to form a placement platform configured to support a cooking grid.

In one exemplary embodiment, the ceramic pellet grill also includes a drip pan assembly, above and distinct from the ceramic inner liner. The drip pan assembly may be removably seated within the ceramic oven body and may be configured to collect oil (e.g., broadly construed to encompass any liquids and/or solids) dripped (or otherwise falling) from food cooking on a cooking grid above the drip pan assembly. The drip pan assembly may prevent the oil from falling onto any surface of the ceramic inner liner below the drip pan assembly. The drip pan assembly may include a drip pan having an outer edge juxtaposed to an inner wall of the ceramic oven body, an opening defined by sidewalls in a floor of the drip pan, a flame tent below the opening and having a flame tent outer perimeter that is larger than an outer perimeter of the sidewalls defining the opening, the flame tent configured to prevent flame rising from the firepot from passing through the opening and configured to evenly distribute heat from the flame across a bottom of the drip pan assembly, and an oil diffuser structure above the opening, the oil diffuser structure having an oil diffuser outer perimeter that is larger than the outer perimeter of the sidewalls defining the opening. The oil diffuser structure may have a plurality of heat diffuser openings around an outer edge of the oil diffuser structure and may be configured to evenly distribute heat rising from the opening across the cooking grid via the plurality of heat diffuser openings.

According to another embodiment, a ceramic pellet grill may include a ceramic oven body having a first through-hole in a side wall of the ceramic oven body, a conduit extending into and through the first through-hole and spanning between a space external to the ceramic oven body and a space internal to the ceramic oven body, an auger within a tube configured within the conduit, a firepot configured within the conduit and operationally positioned toward an end of the conduit that is in the space internal to the ceramic oven body, the firepot having an open top, the firepot configured to receive pellets from the auger, and a ceramic inner liner removably seated within the space internal to the ceramic oven body. The ceramic inner liner may have an outer edge juxtaposed to an inner wall of the ceramic oven body, a portion juxtaposed to and covering the conduit in the space internal to the ceramic oven body, and a second through-hole aligned with and juxtaposed to the open top of the firepot. The ceramic inner liner may be configured to thermally insulate the conduit from heat in the space within the ceramic oven body that is above the ceramic inner liner.

In some examples, the ceramic pellet grill may also include a protruding feature, protruding into the space internal to the ceramic oven body from a bottom surface of the ceramic oven body, where the conduit is configured to rest on the protruding feature to ensure that the open top of the firepot is aligned with and juxtaposed to the second through-hole of the ceramic inner liner.

In one embodiment, the ceramic pellet grill may also include a fan at an end of the conduit in the space external to the ceramic oven body, where the fan is configured to regulate combustion air forced into a plurality of openings in a side of the firepot, the fan in fluid communication with the plurality of openings via the conduit.

With respect to the ceramic inner liner and the conduit, the portion of the inner liner that is juxtaposed to and covering the conduit in the space internal to the ceramic oven body may be a bulge having a shape that conforms to a shape of the conduit that is also in the space internal to the ceramic oven body. The conduit may have a top surface and an opposing bottom surface having edges that are joined by opposing sidewalls, and a rear wall having edges that join the top surface, the opposing bottom surface, and the opposing sidewalls. In one example, a portion of the conduit that is juxtaposed to and covered by the ceramic inner liner may be the top surface of the conduit that is in the space internal to the ceramic oven body. In another example, the portion of the conduit that is juxtaposed to and covered by the ceramic inner liner may be the top surface and the opposing sidewalls of the conduit that are in the space internal to the ceramic oven body. In still another example, the portion of the conduit that is juxtaposed to and covered by the ceramic inner liner may be the top surface, the opposing sidewalls, and the rear wall of the conduit that are in the space internal to the ceramic oven body.

In one embodiment, the ceramic pellet grill may also include a drip pan assembly, above and distinct from the ceramic inner liner, the drip pan assembly removably seated within the ceramic oven body and configured to collect oil (broadly construed as any liquid and/or solid) dripped (or otherwise dripped) from food cooking on a cooking grid above the drip pan assembly and prevent the oil from falling onto any surface of the ceramic inner liner below the drip pan assembly. In one example, the drip pan assembly may include a drip pan having an outer edge juxtaposed to an inner wall of the ceramic oven body, an opening defined by sidewalls in a floor of the drip pan, a flame tent below the opening and having a flame tent outer perimeter that is larger than an outer perimeter of the sidewalls defining the opening, the flame tent configured to prevent flame rising from the firepot from passing through the opening and configured to evenly distribute heat from the flame across a bottom of the drip pan assembly, and an oil diffuser structure above the opening, the oil diffuser structure having an oil diffuser outer perimeter that is larger than the outer perimeter of the sidewalls defining the opening. The oil diffuser structure may have a plurality of heat diffuser openings around an outer edge of the oil diffuser structure and may be configured to evenly distribute heat rising from the opening across the cooking grid via the plurality of heat diffuser openings.

In yet another embodiment, a ceramic pellet grill may include a ceramic oven body having a first through-hole in a side wall of the ceramic oven body, a conduit extending into and through the first through-hole and spanning between a space external to the ceramic oven body and a space internal to the ceramic oven body, means for storing pellets, means for moving the pellets within the conduit, a firepot within the conduit and operationally positioned toward an end of the conduit that is in the space internal to the ceramic oven body, the firepot having an open top, the firepot configured to receive pellets from the means for moving the pellets, and means for insulating the conduit from heat in the space within the ceramic oven body that is above the means for insulating the conduit.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

Figure 1:
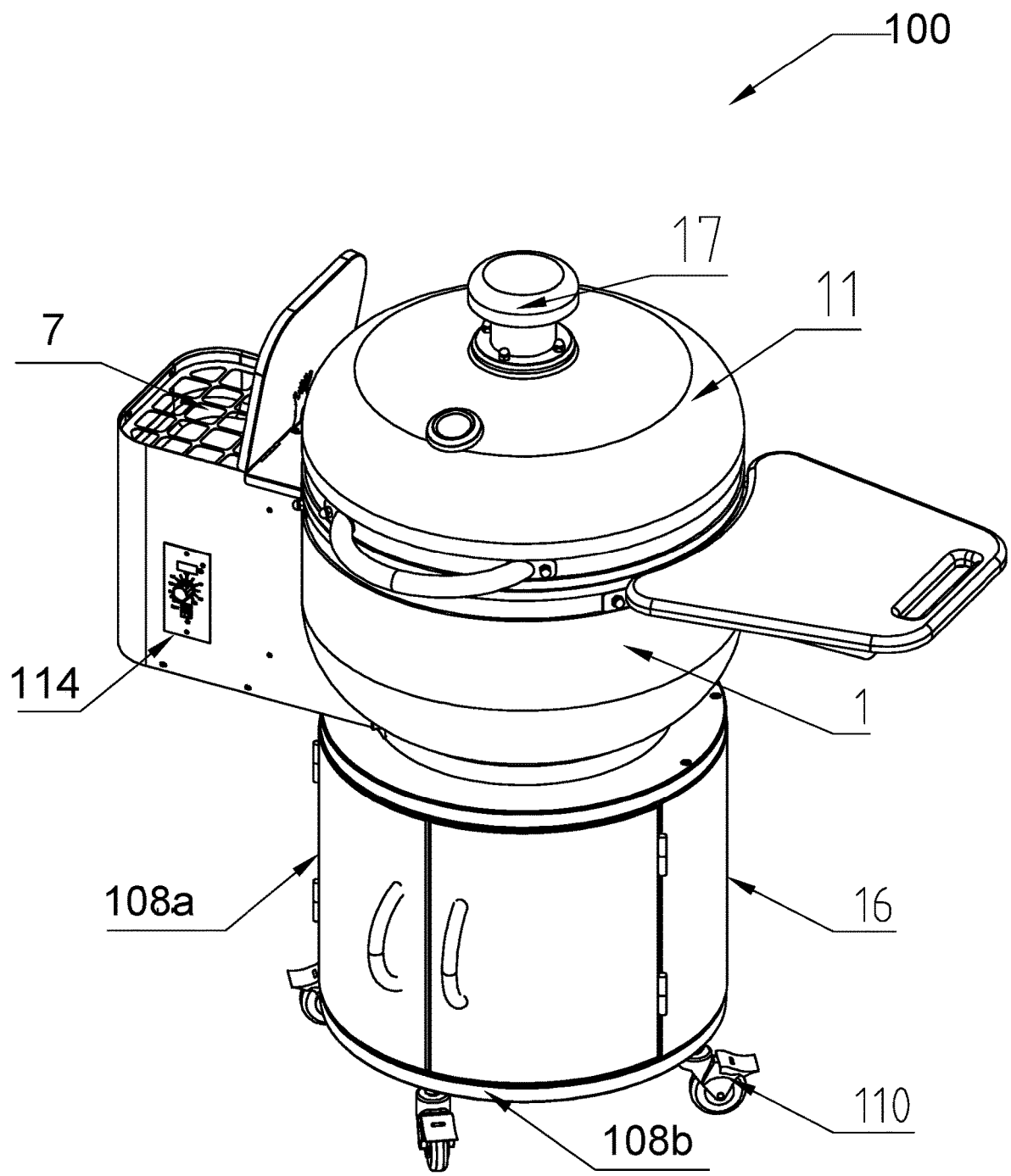
FIG. 1 is a perspective view of a ceramic pellet grill on a stand according to an embodiment of the disclosure.

In the following description, specific details are given to provide a thorough understanding of the embodiments. However, it will be understood by one of ordinary skill in the art that the embodiments may be practiced without these specific details.

Overview

Embodiments of the present disclosure are directed solving the problems that existing pellet-fired grills or ovens used in the barbecue industry have not been able to solve, and are more specifically directed to providing structures to protect those features of a pellet-fired barbeque grill that are used to feed the pellets, and supply the combustion air, into the pellet furnace (e.g., a firepot 4), improve the burning efficiency of the pellet fuel and overcome the problems of insufficient combustion of charcoal associated with charcoal-fired barbeque grills and poor taste associated with electromagnetic power barbeque grills.

The ceramic pellet grill of the present disclosure includes a ceramic oven body with a first through-hole opening (referred to herein as a first through-hole) in a side of the ceramic oven body. The ceramic pellet grill further includes a conduit (as used herein, a conduit may be, for example, a strip-shaped part, a duct, a tube, an elongated hollow structure of any shape), which may be inserted through the first through-hole into the ceramic oven body. A wood pellet combustion chamber, also referred to herein as a pellet furnace and/or a firepot may be included within the portion of the conduit that is within the ceramic oven body. Generally, the firepot is positioned in the center of the ceramic oven body, in a bottom area (e.g., closer to the floor than the upper opening of the ceramic oven body). A ceramic inner liner may be included within the ceramic oven body, wherein the ceramic inner liner may be configured to fit to an inner wall of the ceramic oven body. The ceramic inner liner may be placed on an upper surface of the conduit and may be equipped with a second through-hole opening (referred to herein as a second through-hole) aligned with (e.g., vertically aligned with, coaxial with) the firepot within the conduit. The ceramic inner liner maybe provided with a bulge, where a shape of the bulge is matched to a shape of the conduit within the ceramic oven body. A ceramic oven cover may be fitted on top of the ceramic oven body, to create a closed cooking space defined by the ceramic oven cover walls, the ceramic inner liner floor, and the portions of the ceramic oven body walls that are above the ceramic inner liner floor.

The oven body, oven cover and inner liner of the ceramic pellet grill are all made of ceramics, which are capable of withstanding high temperature, and will protect the oven body, oven cover, and inner liner from the adverse effects of the high temperature. The adverse effects may include, for example, warping and rusting, which could occur if these parts were made of metal. To denote that the oven body, oven cover and inner liner are made of ceramic, they will be referred to herein as the ceramic oven body, the ceramic oven cover, and the ceramic inner, respectively. In some embodiments, the firepot may also be made of ceramics. As used herein the word pellet may refer to wood pellets or to food grade or food compatible pellet shaped fuel of any composition. As used herein a pellet is generally shaped roughly as a right circular cylinder, however, any shape of wood pellet or other pellet shaped fuel of any composition that is able to be mechanically conveyed from a hopper (e.g., a pellet feeding/storage box) to a firepot in a ceramic pellet grill such as those in the exemplary embodiments described herein are within the scope of this disclosure.

Furthermore, the ceramic pellet grill may include a pellet conveyance device having a first end and a second end. A hopper may be coupled to the first end of the pellet conveyance device. The second end of the pellet conveyance device may be coupled to the firepot. One example of a pellet conveyance device may be an auger (e.g., a helical shaped, screw shaped, spiral shaped protrusion that forms a groove spiraling toward one end of a shank of the auger) within a tube (e.g., hollow right circular cylinder). The tube may have an inner diameter that is greater than an outer diameter of the auger (e.g., to leave enough clearance to permit the auger to rotate freely within the tube). Other devices that transport, transfer, transmit, and/or push pellets from one end of the device to an opposite end of the device are within the scope of this disclosure. In one example, an auger may extend continuously within its tube within the conduit, from the first end to the second end. One side of the auger may be equipped with an electric motor, which drives (e.g., rotates) the auger of the pellet conveyance device.

The pellet conveyance device may be configured to move pellets from the hopper toward the firepot, such that the rate of pellets falling into the firepot may be controlled by operation of the electric motor. For example, the design of the pellet conveyance device may be configured to ensure that after the pellets from the hopper reach an opening at the bottom of the hopper a gap (e.g., a beginning of a groove in the auger at the first end of the pellet conveyance device), they can drop into the pellet conveyance device and can be pushed forward by the control of electric motor until they reach and fall into the firepot.

As used herein the term "opening" may refer to any closed shape (e.g., circular, polygonal) defined by one or more inward facing sidewall(s) that are connected to form the closed shape. Air, heat, liquids, and/or solids may pass through and/or occupy an interior of the closed shape (i.e., pass through and/or occupy the opening). Such an opening may be referred to herein as a through-hole or a through-hole opening.

The ceramic pellet grill of the present disclosure will be further elucidated with reference to the drawings and specific examples of implementation.

Example 1

FIG. 1 is a perspective view of a ceramic pellet grill 100 on storage cabinet 16 according to an embodiment of the disclosure. The ceramic pellet grill 100 may include a ceramic oven body 1 and a ceramic oven cover 11. The ceramic pellet grill 100 may be coupled to, and supported by, the storage cabinet 16. The storage cabinet 16 may have doors 108a, 108b that open and close to reveal a storage space (not shown) within the storage cabinet 16. A user may store, for example, pellets of different varieties and/or cooking utensils within the storage space. The storage cabinet 16 may include wheels 110 to permit easy positioning of the ceramic pellet grill 100. A smoke outlet 17 (e.g., chimney) may be coupled to a top of the ceramic oven cover 11 and may be configured to expel smoke from within the ceramic pellet grill when the ceramic oven cover 11 is closed. A hopper 7 (e.g., a pellet feeding/storage box) may be coupled to a side of the ceramic oven body 1. The hopper 7 may store pellets that will be used for combustion to generate heated air. The heated air may rise and circulate within the ceramic pellet grill 100 due to convection. A control panel 114, similar to control panel 704 of FIG. 7, may be provided to allow a user to control features of the ceramic pellet grill.

Figure 2:
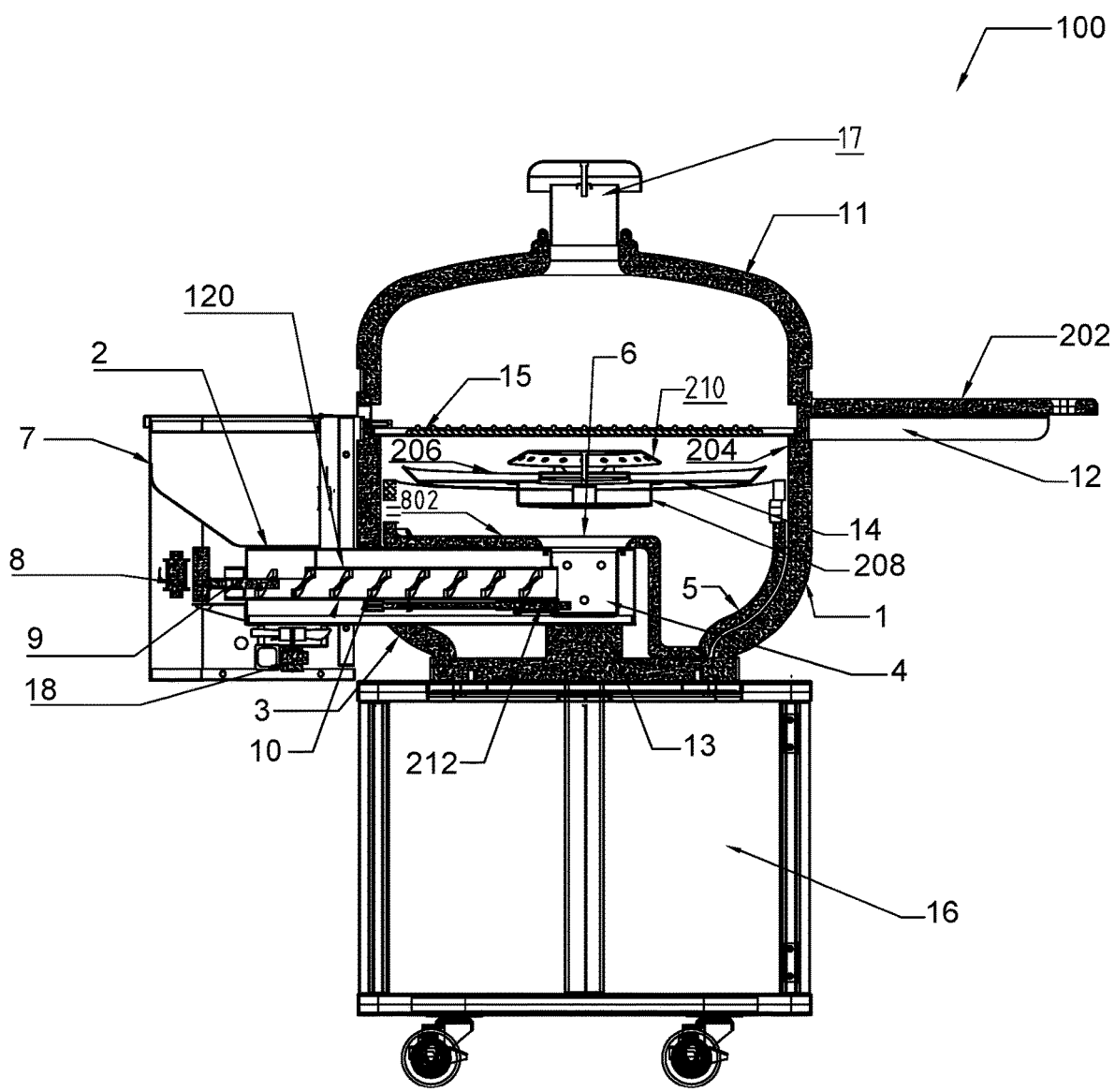
FIG. 2 is a front side partial cross-section of the ceramic pellet grill of FIG. 1.
Figure 3A:
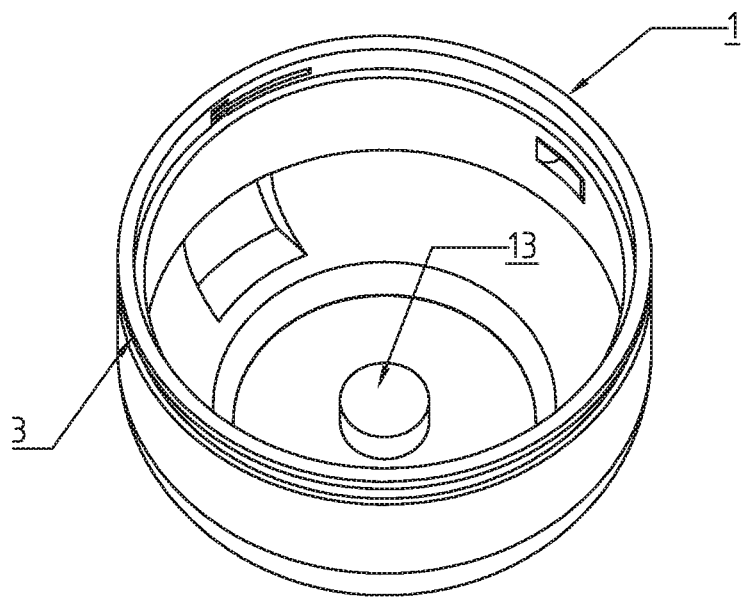
FIG. 3A and FIG. 3B are top and bottom perspective views of a ceramic oven body of the ceramic pellet grill of FIG. 1.
Figure 3B:
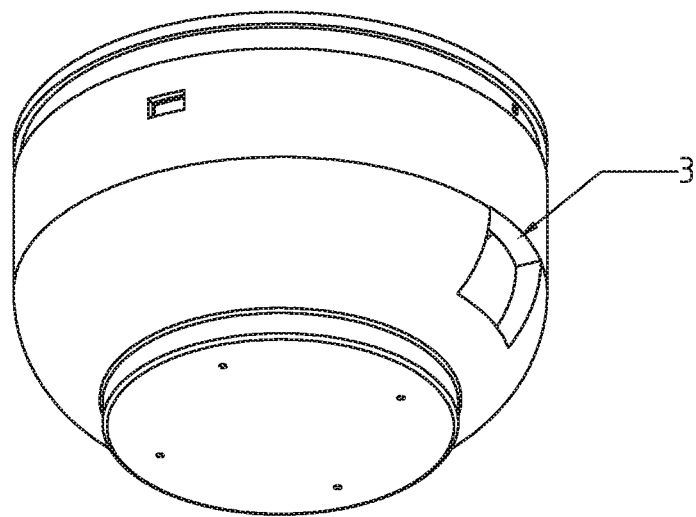
Figure 4A:
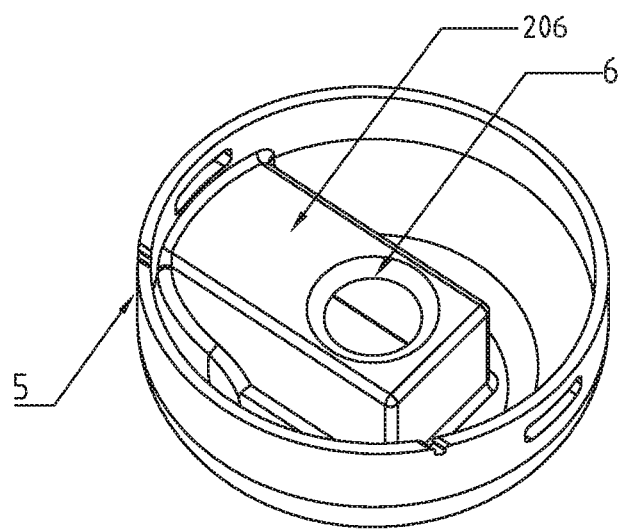
FIG. 4A and FIG. 4B are top and bottom perspective views of a ceramic inner liner of the ceramic pellet grill of FIG. 1.
Figure 4B:
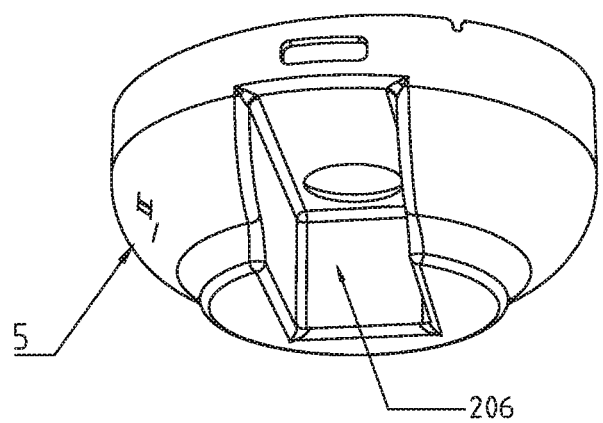

FIG. 2 is a side view partial cross section of the ceramic pellet grill 100 of FIG. 1. FIG. 3A and FIG. 3B are top and bottom perspective views of a ceramic oven body 1 of the ceramic pellet grill 100 of FIG. 1. FIG. 4A and FIG. 4B are top and bottom perspective views of a ceramic inner liner 5 of the ceramic pellet grill 100 of FIG. 1.

The ceramic pellet grill 100 may include a ceramic oven body 1 with a first through-hole opening (referred to herein as a first through-hole 3) in a side of the ceramic oven body 1. The ceramic pellet grill 100 may also include a conduit 2 (as used herein, a conduit may be, for example, a strip-shaped part, a duct, a tube, an elongated hollow structure of any shape) inserted through the first through-hole 3 into the ceramic oven body 1. The ceramic pellet grill 100 may also include a firepot 4 (as used herein, a firepot may be a combustion receptacle, a container within which combustion of fuel, such as wood pellets, may occur) suspended within the conduit 2 toward an end of the conduit 2 that is within the ceramic oven body 1. As used herein, references to "within the ceramic oven body" and/or "within the ceramic pellet grill" may mean "within a space that is defined by the interior sidewall(s) of the ceramic oven body" and/or or "within a space that is defined by the interior sidewall(s) of the ceramic oven body and a ceramic oven cover seated on the ceramic oven body," respectively. The firepot 4 may be removably coupled to the conduit 2. The firepot 4 may be located at about the center point of the ceramic oven body 1. The ceramic pellet grill 100 may further include a ceramic inner liner 5 within the ceramic oven body 1. According to one embodiment, the ceramic inner liner 5 fits to (e.g., is juxtaposed to, is adjacent to) an inner wall 204 of the ceramic oven body 1 (e.g., the contours of an outer surface of the ceramic inner liner 5 correspond to the contours of the inner wall 204 of the ceramic oven body 1 and are removably juxtaposed to the inner wall 204), the ceramic inner liner 5 may be placed on an upper surface of the conduit 2. Contact between the ceramic inner liner 5 and the upper surface of the conduit 2 is not required, therefore, if may be said a portion of the ceramic inner liner 5 may be coupled to, juxtaposed to, or adjacent to the upper surface of the conduit 2. The ceramic inner liner 5 may be equipped with a second through-hole opening (referred to herein as a second through-hole 6) aligned with (e.g., vertically aligned with, coaxial with) the firepot 4, and the ceramic inner liner 5 may be provided with a bulge 206, wherein a shape of the bulge 206 is matched to a shape of the conduit 2 within the ceramic oven body 1 (e.g., the shape of the portion of the conduit 2 that is within the ceramic oven body 1 may nest within the shape of the bulge 206). As used herein, the term "juxtaposed to" may mean, placed side-by-side with, adjacent to, or coupled to, and includes surfaces/objects that are in contact and removably juxtaposed to each other as well as surfaces that are not in contact but that may be immediately next to each other.

According to some aspects, the ceramic pellet grill 100 may further include an auger 10 (the auger 10 may be within a tube), within the conduit 2, having a first end external to the ceramic oven body 1 and a second end coupled to the firepot 4, the auger 10 may extend from the first end to the second end. The ceramic pellet grill 100 may further include a hopper 7 coupled to the first end, to store pellets and to feed the pellets to the first end of the auger. An electric motor 8 at the first end, may be coupled to the auger 10, to rotate the auger 10. The rotation of the auger 10 by the electric motor 8 conveys pellets from the hopper 7 into the firepot 4 via the conduit 2. According to some embodiments, there may be a built-in igniter 212 within the firepot 4.

An outer contour of the ceramic inner liner 5 corresponds to an inner contour of an inner wall 204 of the ceramic oven body 1 and may be releasably coupled to the inner wall 204 of the ceramic oven body 1. The ceramic pellet grill 100 may further include a fan 18 configured to force combustion air from outside of the ceramic oven body 1 into the firepot 4 via the conduit 2. The fan 18 may be used to promote pellet combustion by controlling a speed of the fan 18. A thermostatic control device (not shown) may be in electrical communication with the electric motor 8 rotating the auger 10 and the fan 18 to control combustion of the pellets in the firepot 4 and regulate heat in the ceramic oven body 1 above the ceramic inner liner 5, and below the ceramic oven cover 11.

The ceramic pellet grill 100 may further include a drip pan 14, above and distinct from the ceramic inner liner 5, the drip pan 14 may be configured to collect drippings from food on a cooking grid 15 above the drip pan 14 and to distribute the drippings to a holding receptacle (not shown). The ceramic pellet grill 100 may further include a flame tent 208 located below the drip pan 14 and aligned with the firepot 4 below the drip pan 14, to evenly distribute heat from flame generated by combustion of the pellets in the firepot 4. The ceramic pellet grill 100 may further include an oil diffuser structure 210 located above the drip pan 14 and aligned with an opening in the drip pan 14 and the firepot 4 below the drip pan 14. The oil diffuser structure 210 may prevent oil from dripping into the hole of the drip pan 14 and onto the flame tent 208 and/or into the firepot 4. The flame tent 208, drip pan 14, and oil diffuser structure 210 may form a drip pan assembly 122, similar to the drip pan assembly 522 described herein in conjunction with FIGS. 5 and 10. The drip pan assembly 122, 522 has advantages that include, but are not limited to preventing oil from leaking and/or dripping into the firepot 4, 512; preventing liquids and solid debris from falling into the ceramic inner liner 5, 514, which provides for a clean interior of the ceramic pellet grill 100, 500; and provides for well-distributed heat (e.g., evenly distributed temperature), from the fire in the firepot 4, 512, across the underside of the cooking grid 15, 530.

The ceramic pellet grill 100 may further comprise an igniter switch (not shown) that is electrically coupled to the built-in igniter 212 and the igniter switch is located at a lower side of the conduit 2 outside the ceramic oven body 1.

According to some embodiments, the ceramic pellet grill 100 may further include a ceramic oven cover 11 that covers a top of, and couples to, the ceramic oven body 1, an outer edge of the ceramic oven cover 11 configured to correspond in shape and size to an outer edge of the ceramic oven body 1 and a support frame 12 may be configured external to the ceramic oven body 1 and below the outer edge of the ceramic oven body 1. According to some embodiments, a top of the support frame 12 is about 5-8 mm below the outer edge of the ceramic oven body 1.

The ceramic pellet grill 100 may further include a fixture 13 (e.g., a pedestal, an object integrally or separately formed with and protruding upward from the inside bottom of the ceramic oven body 1) positioned at a bottom of the ceramic oven body 1, where the end of the conduit 2 that is within the ceramic oven body 1 is supported by the fixture 13 to ensure that an open top of the firepot 4 is adjacent to and aligned with (e.g., vertically aligned with, coaxial with) the second through-hole 6 of the ceramic inner liner 5 (e.g., centers of the firepot 4 and the second through-hole 6 are substantially coaxial).

According to some aspects, the inner wall 204 of the ceramic oven body 1 may expand (e.g., increase in diameter) by about 2-3 mm at a top of the ceramic oven body 1 to form a placement platform (e.g., a shelf) configured to support a cooking grid 15. The ceramic pellet grill 100 may further include a storage cabinet 16 coupled to a bottom of the ceramic oven body 1 and configured to support the ceramic oven body 1.

In other words, and as shown in FIGS. 2 to 4, the exemplary embodiment is a brand-new kind of ceramic pellet grill 100, which includes the ceramic oven body 1, wherein one side of the oven body is equipped with a first through-hole 3 capable of receiving a conduit 2 including a firepot 4. The conduit 2 may be inserted into the ceramic oven body 1 until the firepot 4 (which may be releasably supported/suspended within the conduit 2 toward an end of the conduit 2) reaches and is located at about the center lower point of the ceramic oven body 1. There may also be a ceramic inner liner 5 inside the ceramic oven body 1 that can fit with the inner wall 204 of the ceramic oven body 1, meanwhile the ceramic inner liner 5 may be provided with a bulge 206, and the shape of the bulge 206 may be matched with the shape of the inserted part of the conduit 2, so that the ceramic inner liner 5 can be placed on the upper surface of the conduit 2, and the ceramic inner liner 5 may also be equipped with a second through-hole 6 aligned with the firepot 4 when an assembly including at least the hopper 7 and the conduit 2 with a firepot 4 received therein is fixed in an operative position.

The ceramic oven body 1, ceramic oven cover 11 and ceramic inner liner 5 of the ceramic pellet grill 100 may all be made of ceramics, which are capable of withstanding high temperature, and will prevent these parts from the influence of the high temperature (such as, for example corrosion or warping).

The ceramic pellet grill 100 may be featured with an assembly that comprises a hopper 7 (e.g., a feeding box) and the conduit 2 (e.g., a strip-shaped part) having a first end coupled to a discharge port of the hopper 7 and a second end coupled to the firepot 4 (included within the conduit 2). According to some examples, the hopper 7 may be removably coupled to the conduit 2 (and its associated parts), the conduit 2 (and its associated parts) may be removably coupled to the ceramic oven body 1 (e.g., it may be removably coupled to the remainder of the ceramic pellet grill 100), and the firepot 4 may be removably coupled to the conduit 2 (and its associated parts). Thus, each of these components may be considered as "plug-in types" of components.

One side of the conduit 2 may be equipped with an electric motor 8, which drives an auger 10 (e.g., a spiral pushing piece, a helical shaped, screw shaped, spiral shaped protrusion that forms a groove spiraling toward one end of a shank of the auger) within a tube 120 (e.g., hollow right circular cylinder). The auger 10 may be enclosed within the tube 120, where the tube 120 has an inner diameter that is greater than an outer diameter of the auger 10 (e.g., leaving enough clearance to permit the auger 10 to rotate freely within the tube 120). Devices other than an auger 10 within a tube 120, for example, devices that transport, transfer, transmit, and/or push pellets from one end of the device to an opposite end of the device, are within the scope of this disclosure. For conciseness, the auger 10 within the tube 120 may be collectively referred to herein as the auger 10. In one example, the auger 10 may extend continuously through the tube 120 within the conduit 2, from the first end to the second end. One end of the auger 10 may be coupled to an electric motor 8 via a straight rod 9 of the auger 10. The auger 10 may extend continuously through the conduit 2 from the straight rod 9 of the auger 10 to an opening in a side of the firepot 4. Wood pellets conveyed from the hopper 7 to the firepot 4 via the auger 10 (e.g., by rotary motion of an auger 10) may fall into the firepot 4.

The design of the auger 10 may be adopted to ensure that after the pellets reach an opening (e.g., a gap) between the hopper 7 and the conduit 2, then they can be pushed forward by the control of the electric motor 8 until they reach and fall into the firepot 4.

The ceramic pellet grill 100 may be featured with the ceramic oven body 1 and provided with a ceramic oven cover 11 and a support frame 12. The support frame 12 may be configured below (e.g., about 5-8 mm below) the ceramic oven cover 11 on the outer side of the ceramic oven body 1.

A wood board 202 (or a board made of some other material) can be placed on the support frame 12 and materials needed for grilling (e.g., tools, a fork, tongs, a knife and seasonings) can be easily reached while the ceramic oven cover 11 is open, which is convenient.

The ceramic pellet grill 100 may be featured with a fixture 13 (e.g., a pedestal, an object integrally or separately formed with and protruding upward from the inside bottom of the ceramic oven body) positioned at the bottom of the ceramic oven body 1. The fixture 13 may ensure that the end of the conduit 2 (e.g., the strip-shaped part) within the ceramic oven body 1 can be placed in a proper and level position. In one embodiment, the proper and level position may align the opening of the firepot 4, with the second through-hole 6 in the ceramic inner liner 5. In some embodiments, an edge around a top of the opening of the firepot 4 may be immediately adjacent to an edge around a bottom surface adjacent to the second through-hole 6 in the ceramic inner liner 5.

The shape of the ceramic inner liner 5 fits with (e.g., conforms to) the shape of the inner wall 204 of the ceramic oven body 1. In some embodiments, at least some of the outer surface of the ceramic inner liner 5 that is adjacent to the inner wall 204 of the ceramic oven body 1 is in contact with the inner wall 204 of the ceramic oven body. In some embodiments, at least most of the outer surface of the ceramic inner liner 5 that is adjacent to the inner wall 204 of the ceramic oven body 1 is in contact with the inner wall 204 of the ceramic oven body. A thermostatic system (not shown) may control temperature in the space internal to the ceramic oven body 1.

The ceramic pellet grill 100 may be featured with a drip pan assembly 122, above and distinct from the ceramic inner liner 5. The drip pan assembly 122 of FIG. 2 and the drip pan assembly 522 of FIG. 5 may be similar and are collectively represented in various views of the drip pan assembly 522 in FIGS. 10A, 10B, 10C, and 10D. A more detailed explanation of these figures is provided in connection with the description of the drip pan assembly 522 of FIG. 5 and will not be repeated here for the sake of brevity. As indicated above, the ceramic pellet grill 100 may further include a drip pan assembly 122, above and distinct from the ceramic inner liner 5. The drip pan assembly 122 may be removably seated within the ceramic oven body 1 and may be configured to collect oil dripped from food cooking on a cooking grid 15 above the drip pan assembly 122 and prevent the oil from falling onto any surface of the ceramic inner liner 5 below the drip pan assembly 122. As used herein, the word "oil" may be used to refer to any liquid, including but not limited to oil, that falls from the cooking grid 15. Exemplary liquids include oil, sauce, and/or water. Furthermore, the word "oil" may be used so broadly as to include any liquid and/or any solid (e.g., a piece of food, or seasoning) that falls from the cooking grid 15. Accordingly, as used herein the drip pan may be configured to collect any liquid or solid that falls from the cooking grid 15. In greater detail, the drip pan assembly 122 may include the drip pan 14 having an outer edge juxtaposed to an inner wall 204 of the ceramic oven body 1, an opening (not shown) defined by sidewalls in a floor of the drip pan 14, and a flame tent 208 below the opening and having a flame tent outer perimeter that is larger than an outer perimeter of the sidewalls defining the opening, the flame tent 208 may be configured to prevent flame rising from the firepot 4 from passing through the opening and may further be configured to evenly distribute heat from the flame across a bottom of the drip pan assembly 122. The drip pan assembly 122 may further include an oil diffuser structure 210 above the opening, the oil diffuser structure 210 may have an oil diffuser structure outer perimeter that is larger than the outer perimeter of the sidewalls defining the opening. The oil diffuser structure 210 may have a plurality of heat diffuser openings around an outer edge of the oil diffuser structure 210. The oil diffuser structure 210 may be configured to evenly distribute heat rising from the opening across the cooking grid 15 via the plurality of heat diffuser openings. In some embodiments, the oil diffuser structure 210 may also be configured to diffuse oil falling onto the oil diffuser structure 210 into oil vapor and direct un-vaporized oil away from the opening and onto the drip pan 14.

The inner wall 204 of the ceramic oven body 1 expands by about 2-3 mm at a top of the ceramic oven body 1 to form a placement platform (e.g., a shelf) configured to support a cooking grid 15.

At the bottom of the ceramic oven body 1 a storage cabinet 16 may be configured and capable of holding the ceramic oven body 1. In other words, the ceramic pellet grill 100 may also include a storage cabinet 16 coupled to a bottom of the ceramic oven body 1 and configured to support the ceramic oven body 1 (and all the features illustrated, for example, in FIG. 2).

According to some embodiments, a pellet combustion device may include the firepot 4 and built-in igniter 212. The built-in igniter 212 may be configured to ignite combustion of the pellets within the firepot 4. An igniter switch (not shown) may be configured on the control panel 114 of the ceramic pellet grill 100 and may be electrically coupled to the built-in igniter 212. A portion of the built-in igniter 212 may extend through the conduit 2 between the igniter switch (not shown) and the built-in igniter 212.

The top of the ceramic oven cover 11 may be equipped with a smoke outlet 17. In other words, the ceramic pellet grill 100 may include a ceramic oven cover 11 that covers a top of the ceramic oven body 1 and mates with a top edge of the ceramic oven body 1, and a smoke outlet 17 may be coupled to a top of the ceramic oven cover 11 and may be configured to expel smoke.

A fan 18 may be installed at a lower side of the conduit 2.

In some embodiments, the speed of conveying pellets by the auger 10 (e.g., the internal screw system, the spiral pusher part, the auger) and the rotation speed of the fan 18 can be both controlled by the drive power of the electric motor 8, thereby controlling the strength/heat of the fire in the firepot 4 properly.

The ceramic pellet grill 100 includes the ceramic oven body 1 and a ceramic oven cover 11, and the support frame 12 is also configured approx. 5-8 mm below the ceramic oven cover 11 on the outer side of the ceramic oven body 1.

A wood board 202 can be placed on the support frame 12, and materials needed for roasting can be easily fed while the ceramic oven cover 11 is open, which is more convenient.

Accordingly, the ceramic pellet grill 100 may include a ceramic oven body 1 and a ceramic inner liner 5. The ceramic oven body 1 may include a first through-hole 3 in a side of the ceramic oven body 1. A conduit 2 may be inserted through the first through-hole 3 into the ceramic oven body 1. A firepot 4 may be removably coupled to the conduit 2 toward an end of the conduit 2 that is within the ceramic oven body 1. The ceramic inner liner 5 may conform to a shape of, and may fit to, a portion of a ceramic oven body 1 inner wall 204. The ceramic inner liner 5 may cover the conduit 2 and may include a second through-hole 6 aligned with the firepot 4. A bulge in the ceramic inner liner 5 may conform to a shape of the conduit 2 within the ceramic oven body 1 and may protect the conduit 2 from cooking debris, including liquid and solid debris falling from a cooking grid 15 above the ceramic inner liner 5, and from heat, rising from a flame in the firepot 4, that circulates within a portion of the oven body 1 that is above the ceramic inner liner 5 (e.g., above an entire inner surface of the ceramic inner liner 5 that faces inward and/or upward). The firepot 4 may receive fuel (e.g., wood pellets conveyed by, for example, an auger 10) and air (e.g., forced toward the firepot by action of, for example, a fan 18) via the conduit 2.

Example 2

Figure 5:
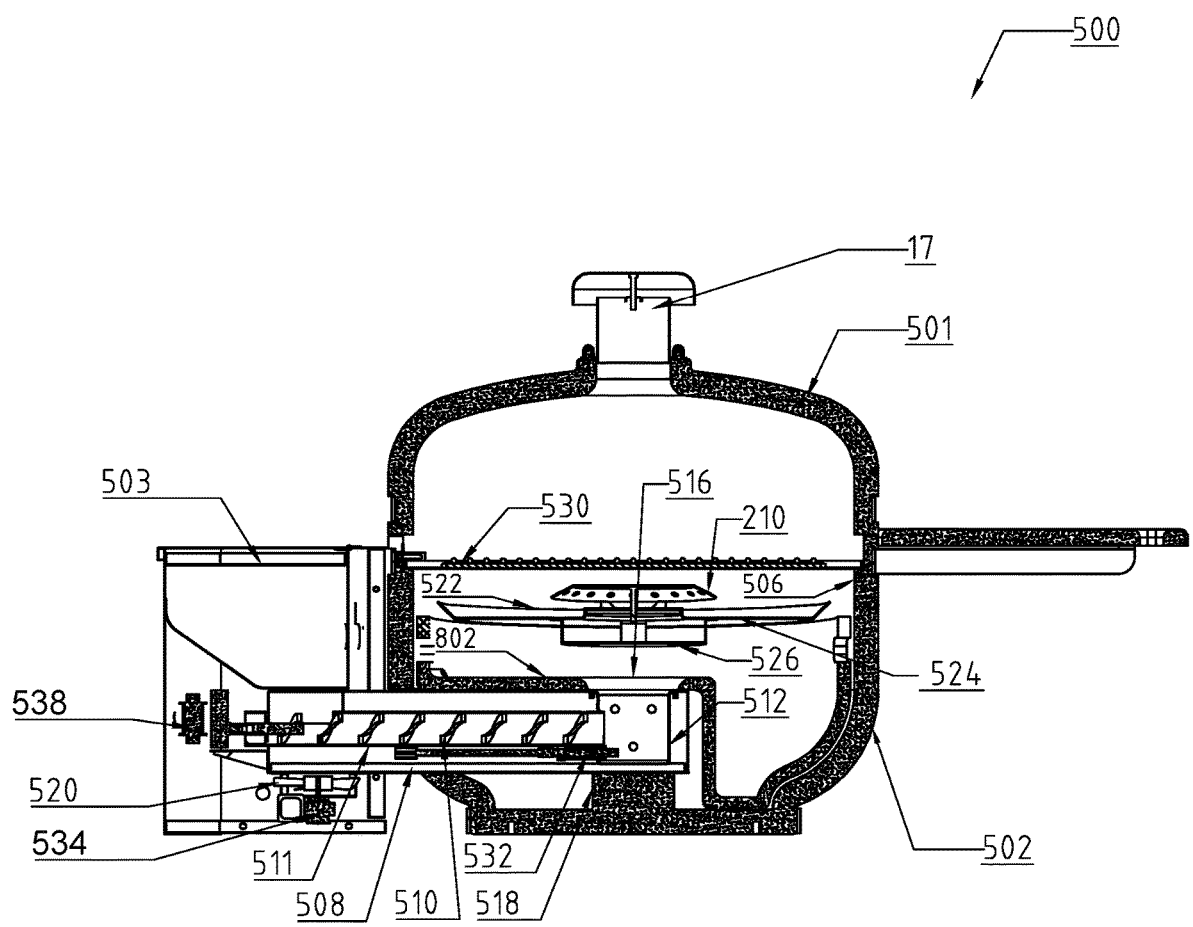
FIG. 5 is a front side cross-section of a ceramic pellet grill according to an embodiment of the disclosure.

FIG. 5 is a front side cross-section of a ceramic pellet grill 500 according to an embodiment of the disclosure. The ceramic pellet grill 500 may be similar to the ceramic pellet grill 100 of FIGS. 1-4.

The ceramic pellet grill 500 may include a ceramic oven cover, referred to herein as a ceramic cover 501, and a ceramic oven body 502. The ceramic oven body 502 may have a first through-hole (referred to herein as a first through-hole 604 (FIG. 6)) in a side of the ceramic oven body 502. According to some embodiments, the ceramic oven body 502 may additionally include an oil waste through-hole (referred to herein as an oil waste through-hole 608). The oil waste through-hole 608 may be configured to receive an oil transport conduit/channel 1012 (FIG. 10A) of the drip pan assembly 522. The oil transport conduit/channel 1012 may convey oil in liquid state from the drip pan 524 to an oil collection container (not shown). The ceramic pellet grill 500 may further include a conduit 508 (as used herein, a conduit may be, for example, a strip-shaped part, a duct, a tube, an elongated hollow structure of any shape) extending into and through the first through-hole 604 and spanning between a space external to the ceramic oven body 502 and a space internal to the ceramic oven body 502. In other words, the conduit 508 extends through the first though-hole 604 and into the ceramic oven body 502. The ceramic pellet grill 500 may further include an auger 510 within a tube 511 (collectively referred to herein as the auger 510) configured within the conduit 508. Accordingly, in one example, the ceramic pellet grill 500 may further include an auger 510 configured within the conduit 508. The auger 510 may be coupled to an electric motor 538 via a straight rod 509 of the auger 510. The ceramic pellet grill 500 may further include hopper 503 (e.g., a pellet feeding/storage box) that may be coupled to a side of the ceramic oven body 502. The hopper 503 may store pellets that will be used for combustion to generate heat in the firepot 512. The hopper 503 may be coupled to an opening in the auger 510 in the space external to the ceramic oven body 502. Pellets may be conveyed from the hopper 503 to the firepot 512 by action of the auger 510. According to some examples, the hopper 503 may be removably coupled to the conduit 508 (and its associated parts), the conduit 508 (and its associated parts) may be removably coupled to the ceramic oven body 502 (e.g., it may be removably coupled to the remainder of the ceramic pellet grill 500), and the firepot 512 may be removably coupled to the conduit 508 (and its associated parts). Thus, each of these components may be considered as "plug-in types" of components.

A firepot 512 within the conduit 508 may be operationally positioned toward an end of the conduit 508 that is in the space internal to the ceramic oven body 502. In other words, a firepot 512 configured within the conduit 508 may be operationally positioned toward an end of the conduit 508 that is within the ceramic oven body 502. The firepot 512 may have an open top. The firepot 512 may be configured to receive pellets from the auger 510. The pellets may be received, for example, via an opening (not shown) in the side of the firepot 512. In some embodiments (not shown), the firepot 512 may be configured to receive pellets that drop into the open top of the firepot 512 from the auger 510 that may be positioned above the open top of the firepot 512 (embodiment not shown). The firepot 512 may include an igniter (referred to herein as a built-in igniter 532) configured to ignite combustion of the pellets within the firepot 512. An igniter switch 702 (FIG. 7A) may be configured on a control panel 704 of the ceramic pellet grill 500 and may be electrically coupled to the built-in igniter 532. A portion of the built-in igniter 532 may extend through the conduit 508 between the igniter switch 702 and the built-in igniter 532

The ceramic pellet grill 500 may further include a ceramic inner liner 514 removably seated within (e.g., the space internal to) the ceramic oven body 502. The ceramic inner liner 514 may have an outer edge juxtaposed to an inner wall 506 of the ceramic oven body 502. The ceramic inner liner 514 may have a portion juxtaposed to (e.g., placed side-by-side) and covering the conduit 508 within (e.g., in the space internal to) the ceramic oven body 502 and may have a second through-hole opening (referred to herein as a second through-hole 516) aligned with and juxtaposed to the open top of the firepot 512. The second through-hole 516 may be defined by sidewalls of the ceramic inner liner 514. The open top of the firepot 512 may be defined by an edge of a flange 920 (FIG. 9) surrounding the open top of the firepot 512. The flange 920 may be removably coupled to the conduit 508 using screws 922 (FIG. 9). The screws 922 may be configured to be rotated by hand, without need for a screwdriver. The ceramic inner liner 514 may be configured to thermally insulate the conduit 508 from heat that is in the space within the ceramic oven body 502 that is above the ceramic inner liner 514 (and below the ceramic cover 501). The heated air may be generated by combustion of the pellets within the firepot 512. In other words, the ceramic inner liner 514 may be configured to thermally insulate the conduit 508 from heat (that will rise and/or circulate from a flame in the firepot 512) within a portion of the ceramic oven body 502 (e.g., within a portion of the ceramic oven body 502) that is above the ceramic inner liner 514 (e.g., above an entire inner surface of the ceramic inner liner 514 that faces inward and/or upward). The ceramic inner liner 514 may be configured to protect the conduit 508 from cooking debris, including liquid and solid debris, falling from a cooking grid 530 above the ceramic inner liner 514.

The ceramic pellet grill 500 may further include a protruding feature 518 (e.g., a pedestal, an object integrally or separately formed with and protruding upward from the inside bottom of the ceramic oven body 502), which may be configured to protrude (e.g., project) into the space internal to the ceramic oven body 502 from a bottom surface of the ceramic oven body 502. The conduit 508 may be configured to rest on the protruding feature 518 to ensure that the open top of the firepot 512 is aligned with and juxtaposed to the second through-hole 516 of the ceramic inner liner 514.

The ceramic pellet grill 500 may further include a fan 520 (e.g., an induction fan) at an end of the conduit 508 external to the ceramic oven body 502 (e.g., an end off the conduit in the space external to the ceramic oven body 502). The fan 520 may be configured to regulate (by control of the speed of a fan motor 534) combustion air forced into a plurality of openings 910 (FIG. 9) in a side of the firepot 512. The fan 520 may be in fluid communication with the plurality of openings 910 via the conduit 508 (e.g., via open space not occupied by, for example, the auger 510 and tube 511).

The fan 520 may be installed at a lower side of the conduit 508. In some embodiments, the speed of conveying pellets by the auger 10 and the rotation speed of the fan 520 can both controlled independently collectively, by an electronic circuit (not shown), thereby controlling the strength/heat of the fire in the firepot 512.

In some embodiments, the portion, of the ceramic inner liner 514, juxtaposed to and covering the conduit 508 within the ceramic oven body 502 may be a bulge 802 (FIG. 8) having a shape that conforms to a shape of the conduit 508 that is also within the ceramic oven body 502.

According to some embodiments, the conduit 508 may have a top surface 902 and an opposing bottom surface 904 (e.g., a facing bottom surface) having edges that are joined by opposing sidewalls 906 (one sidewall shown), and a rear wall 908 having edges that join the top surface 902, the opposing bottom surface 904, and the opposing sidewalls 906. In some aspects, the portion of the conduit 508 that is juxtaposed to and covered by the ceramic inner liner 514 may be the top surface 902 of the conduit 508 that is within (e.g., in the space internal to) the ceramic oven body 502. In another aspect, the portion of the conduit 508 that is juxtaposed to and covered by the ceramic inner liner 514 may be the top surface 902 and the opposing sidewalls 906 of the conduit 508 that are within the ceramic oven body 502. According to still other aspects, the portion of the conduit 508 that is juxtaposed to and covered by the ceramic inner liner 514 may be the top surface 902, the opposing sidewalls 906, and the rear wall 908 of the conduit 508 that are within the ceramic oven body 502.

The ceramic inner liner 514 may be configured to thermally insulate the conduit 508 from heated air circulating in the space within the ceramic oven body 502 above the ceramic inner liner 514.

The ceramic pellet grill 500 may further include a drip pan assembly 522, above and distinct from the ceramic inner liner 514. The drip pan assembly 522 may be similar to the drip pan assembly 122 of FIG. 2 and both may be individually or collectively referred to as drip pan assembly 522. The drip pan assembly 522 may include a drip pan 524, a flame tent 526 below the drip pan 524, and oil diffuser structure 528 above the drip pan 524. The drip pan assembly 522 may be removably seated within the ceramic oven body 502 and configured to collect oil dripped from food cooking on a cooking grid 530 above the drip pan assembly 522 and prevent the oil from falling onto any surface of the ceramic inner liner 514 below the drip pan assembly 522. As used herein, the word "oil" may be used to refer to any liquid, including but not limited to oil, that falls from the cooking grid 15. Exemplary liquids include oil, sauce, and/or water. Furthermore, the word "oil" may be used so broadly as to include any liquid and/or any solid (e.g., a piece of food, or seasoning) that falls from the cooking grid 15.

Figure 10A:
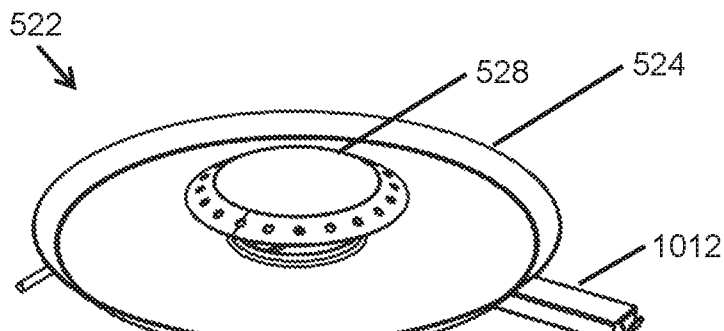
FIG. 10A is a top rear perspective view of a drip pan assembly according to embodiments herein.
Figure 10B:
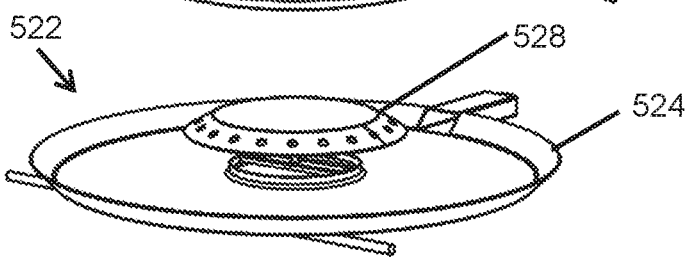
FIG. 10B is a top front perspective view of the drip pan assembly of FIG. 10A.
Figure 10C:
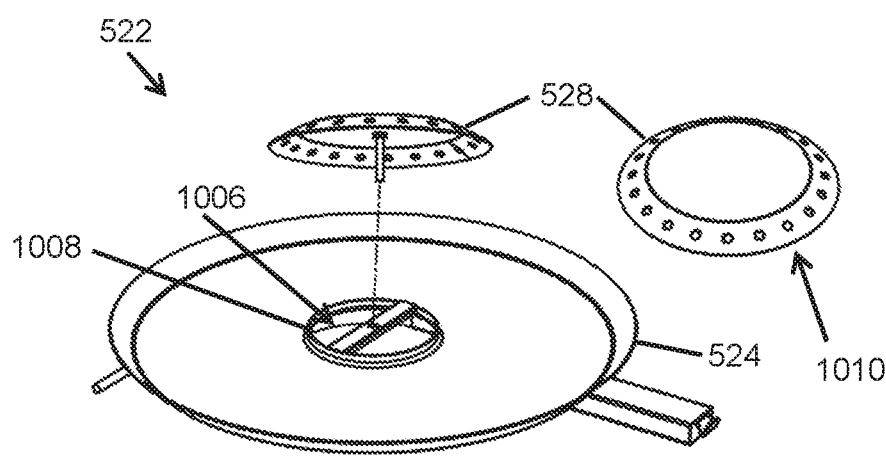
FIG. 10C is an exploded top rear perspective view of the drip pan assembly of FIG. 10A, in which a bottom of the oil diffuser structure is depicted above the drip pan and a top of the oil diffuser structure is depicted above and offset to the right of the drip pan.
Figure 10D:
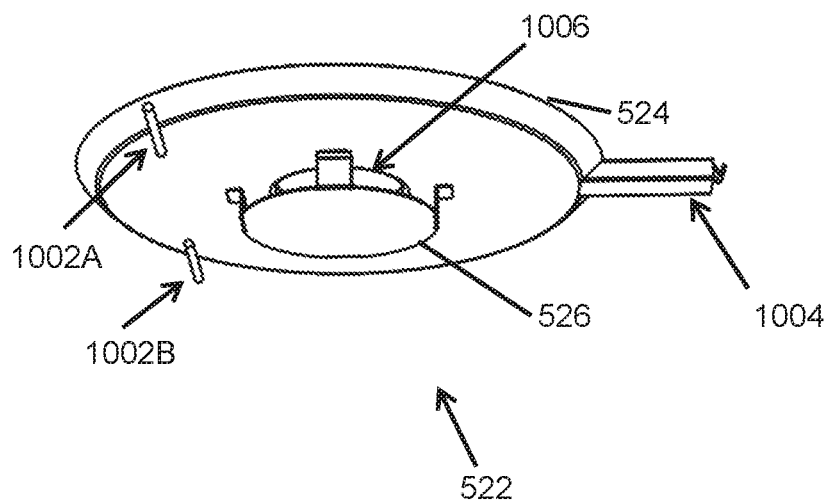
FIG. 10D is a bottom side perspective view of the drip pan assembly of FIG. 10A.

In the following passages, in connection with the drip pan assembly 522, reference may be made to FIGS. 10A-10D. FIG. 10A is a top rear perspective view of a drip pan assembly 522 according to embodiments herein. FIG. 10B is a top front perspective view of the drip pan assembly 522 of FIG. 10A, FIG. 10C is an exploded top rear perspective view of the drip pan assembly 522 of FIG. 10A, in which a bottom of the oil diffuser structure 528 is depicted above the drip pan 524 and a top of the oil diffuser structure 528 is depicted above and to the right of the drip pan 524. FIG. 10D is a bottom side perspective view of the drip pan assembly 522 of FIG. 10A.

Figure 6:
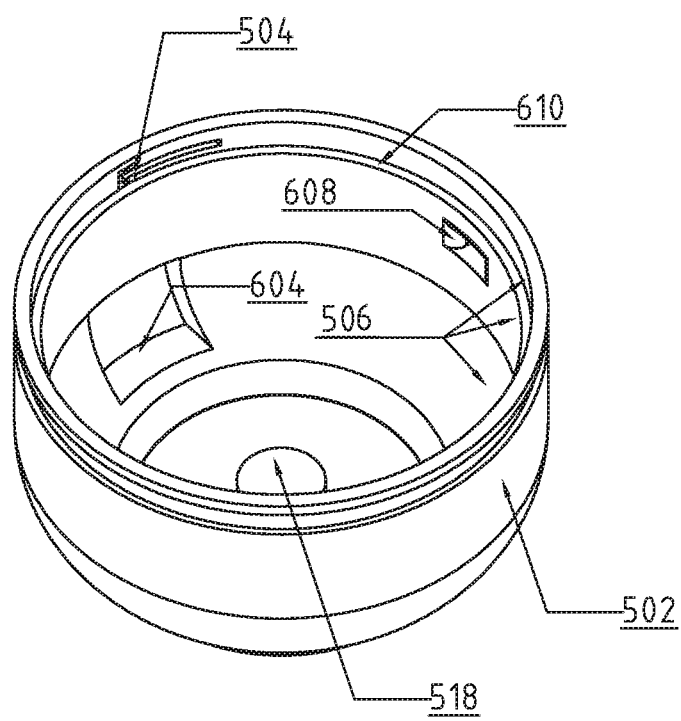
FIG. 6 is a perspective view of the ceramic oven body of FIG. 5.

According to some embodiments, the drip pan assembly 522 may be removably seated within the ceramic oven body 502 by resting the drip pan assembly 522 on an underside of rods 1002A, 1002B (FIG. 10D) received by the ceramic inner liner 514 or the ceramic oven body 502 and on an underside 1004 (FIG. 10D) of oil transport conduit/channel 1012 (FIG. 10A) received in the oil waste through-hole 608 (FIG. 6). The oil transport conduit/channel 1012 may convey oil in liquid state from the drip pan 524 to an oil collection container (not shown). The oil transport conduit/channel 1012 may be included in the drip pan assembly 522.

The drip pan assembly 522 may include a drip pan 524 having an outer edge juxtaposed to an inner wall 506 of the ceramic oven body 502. In some examples, the outer edge may be juxtaposed to and spaced apart from the inner wall by some distance such that there exists an open space between the outer edge and the inner wall 506. The open space may provide for easy insertion and withdrawal of the drip pan assembly 522 from the ceramic oven body 502. The drip pan assembly 522 may further include an opening 1006 defined by sidewalls 1008 (FIG. 10C, 10D) in a floor of the drip pan 524. As used herein, the term "sidewalls" may be understood in either singular or plural. For example, the sidewalls defining a circular opening may be understood to refer to one continuous sidewall surrounding the opening, whereas the sidewall surrounding a square opening may be understood to refer to four joined sidewalls. The drip pan assembly 522 may further include a flame tent 526 below the opening 1006 and having a flame tent outer perimeter that is larger than an outer perimeter of the sidewalls 1008 defining the opening 1006. The flame tent 526 may be configured to prevent flame rising from the firepot 512 (FIG. 5) from passing through the opening 1006 and may be configured to evenly distribute heat from the flame across a bottom of the drip pan assembly 522. The drip pan assembly 522 may further include an oil diffuser structure 528 above the opening 1006. The oil diffuser structure 528 may have an oil diffuser outer perimeter that is larger than the outer perimeter of the sidewalls 1008 defining the opening 1006. The oil diffuser structure 528 may have a shape that helps to distribute oil falling onto the oil diffuser structure 528 into the drip pan 524 (e.g., a concave shape, an umbrella shape, a flattened conical shape). The oil diffuser structure 528 may have a plurality of heat diffuser openings 1010 (FIG. 10C) around an outer edge of the oil diffuser structure 528. The plurality of heat diffuser openings 1010 may be any shape, including but not limited to circles. Each of plurality of heat diffuser openings 1010 may be the same shape or may differ in shape, one from another. The oil diffuser structure 528 may be configured to evenly distribute heat rising from the opening 1006 across the cooking grid 530 (FIG. 5) via the plurality of heat diffuser openings 1010.

According to one embodiment, the centers of the opening 1006, the flame tent 526, and the oil diffuser structure 528 are vertically aligned with a center of the firepot 512. In some embodiments, the oil diffuser structure 528 may also be configured to diffuse oil falling onto the oil diffuser structure 528 into oil vapor and direct un-vaporized oil away from the opening 1006 and onto the drip pan 524. As used herein, "diffuse" means, broadly, disperse and according to some embodiments the oil diffuser structure 528 may disperse oil falling onto it by vaporizing the oil and/or directing the oil away from the opening 1006 and onto the drip pan 524.

Figure 7A:
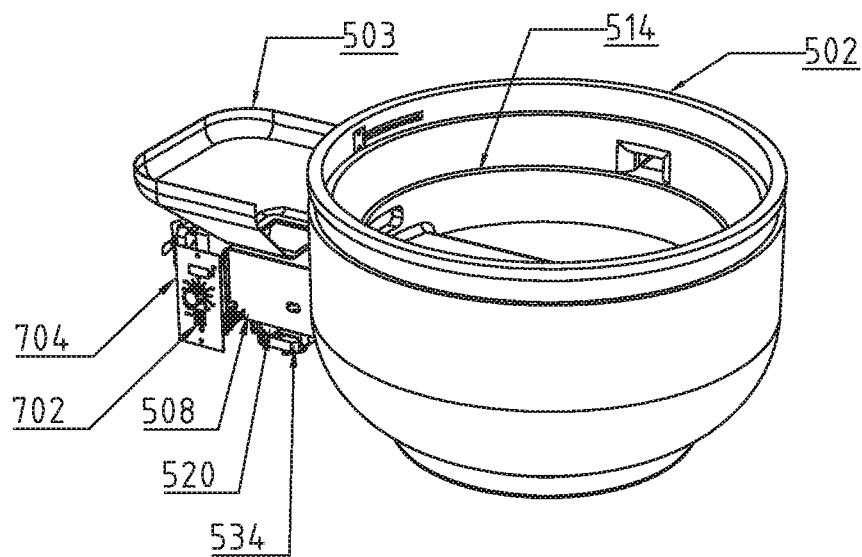
FIG. 7A and FIG. 7B are two perspective views of the ceramic oven body of FIG. 5 with the ceramic inner liner and conduit in their operational positions, according to an embodiment of the disclosure.

FIG. 6 is a perspective view of the ceramic oven body 502 of FIG. 5. The ceramic oven body 502 may include a temperature probe 504 within a recess in the inner wall 506 of the ceramic oven body 502. The temperature probe 504 may measure the temperature of the air within the ceramic oven body 502 in the space within the ceramic oven body 502 that is above the ceramic inner liner 514 and below the ceramic cover 501. Electrical circuitry (including the temperature probe 504) may perform thermostatic control of the measured air temperature to maintain the measured air temperature at a given setpoint. Controls for setting the setpoint may be positioned on the control panel 704 (FIG. 7A). Control of temperature may be obtained, for example, by individual or collective control of the rotation speed of the auger 510 and rotation speed of the fan 520. The rotation speed of the auger 510 and rotation speed of the fan 520 may be set independently of each other or they may be set with a rotation speed of one being dependent on the rotation speed of the other. FIG. 6 also illustrates the first through-hole 604 and the oil waste through-hole 608 as well as the protruding feature 518. Each of these features has been described above so their descriptions will not be repeated for the sake of conciseness. FIG. 6 further illustrates that the inner wall (e.g., the sidewall 805) of the ceramic oven body 502 may be expanded in diameter at a top of the ceramic oven body 502 to form a placement platform 610 (e.g., a shelf) configured to support the cooking grid 530. In some aspects the diameter may be expanded by about 2-3 mm.

Figure 7B:
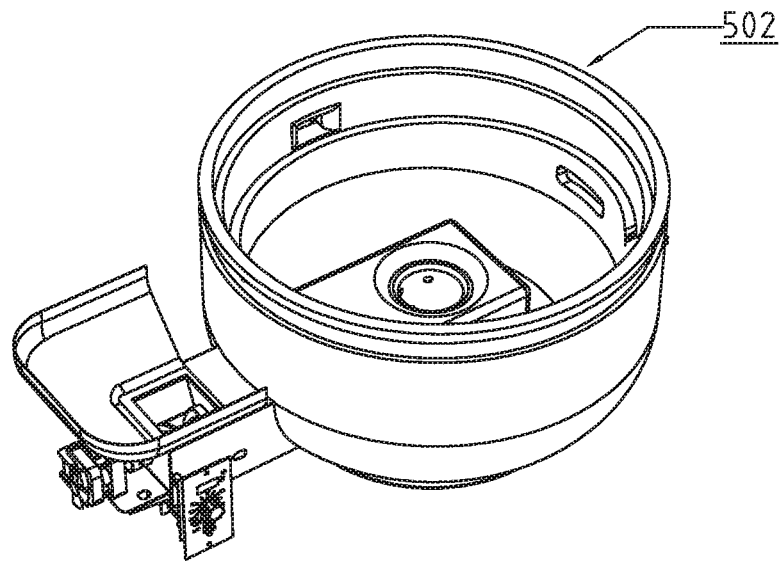

FIG. 7A and FIG. 7B are two perspective views of the ceramic oven body 502 of FIG. 5 with the ceramic inner liner 514 and conduit 508 in their operational positions, according to an embodiment of the disclosure. FIG. 7A and FIG. 7B illustrate the ceramic oven body 502, the ceramic inner liner 514, the hopper 503 (with its back wall removed to improve the clarity of the illustration), the conduit 508, the control panel 704 and the igniter switch 702. Each of these features has been described above, so their descriptions will not be repeated for the sake of conciseness.

Figure 8A:
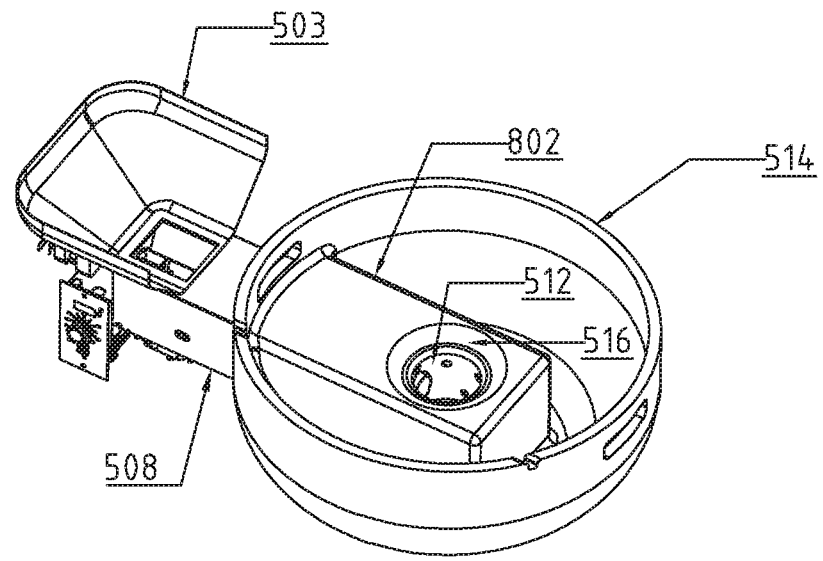
FIG. 8A and FIG. 8B are two perspective views of the embodiment of FIG. 7A and FIG. 7B, respectively, with the ceramic oven body removed to better illustrate the operational position of the hopper, the ceramic inner liner, and the conduit, according to an embodiment of the disclosure.
Figure 8B:
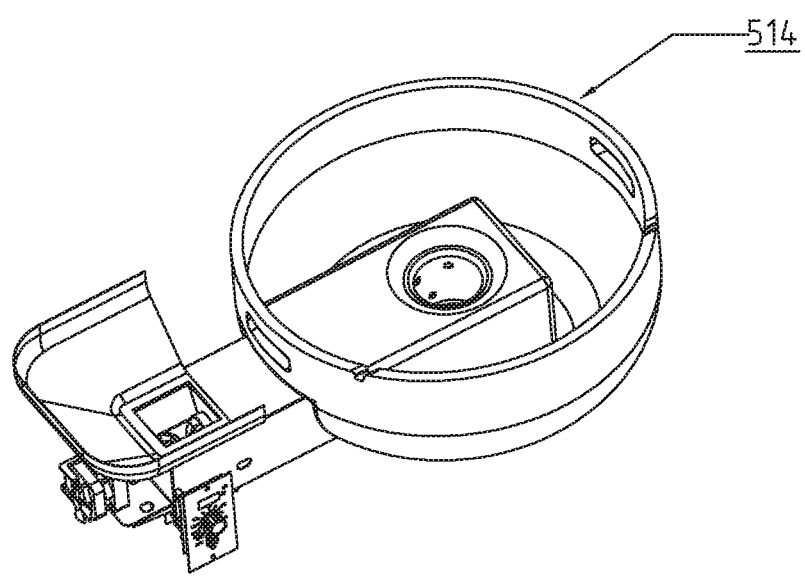

FIG. 8A and FIG. 8B are two perspective views of the embodiment of FIG. 7A and FIG. 7B, respectively, with the ceramic oven body 502 removed to better illustrate the operational position of the hopper 503 (with its back wall removed to improve the clarity of the illustration), the ceramic inner liner 514, and the conduit 508, according to an embodiment of the disclosure. FIG. 8A and FIG. 8B include illustrations of the conduit 508 positioned within an opening/recess/housing/bulge portion of the ceramic inner liner 514. This portion of the ceramic inner liner 514 is juxtaposed to and covering the conduit 508. This portion may be referred to as a bulge 802. As illustrated in this exemplary embodiment, the bulge 802 may have a shape that conforms to a shape of the conduit 508 (that is received into the ceramic inner liner 514). Also, as illustrated in this exemplary embodiment, the second through-hole 516 in the ceramic inner liner 514 is shown aligned with and juxtaposed to the open top of the firepot 512. Each of these features has been described above, so their descriptions will not be repeated for the sake of conciseness.

Figure 9A:
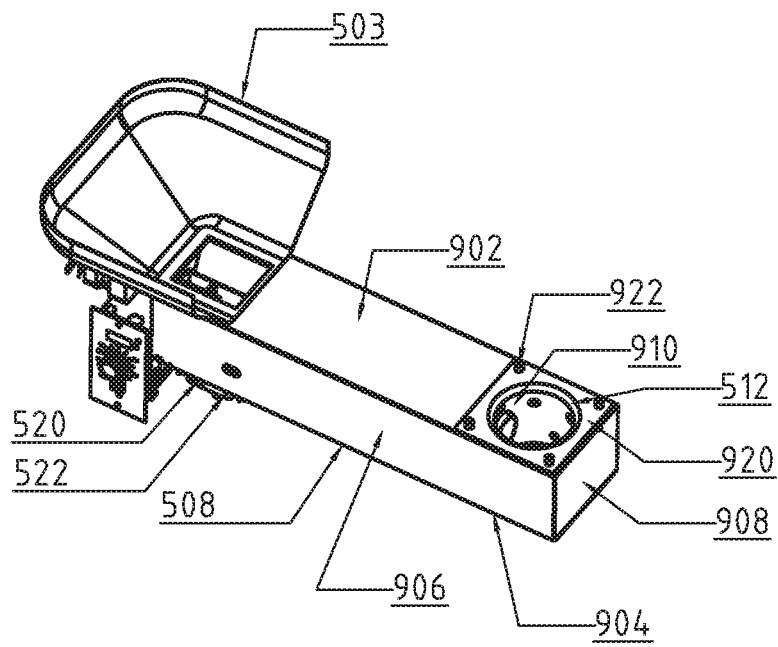
FIG. 9A and FIG. 9B are two perspective views of the embodiment of FIG. 8A and FIG. 8B, respectively, with the ceramic inner liner removed to better illustrate the operational position of the hopper, the conduit, and the firepot positioned within/removably secured to the conduit, according to an embodiment of the disclosure.
Figure 9B:
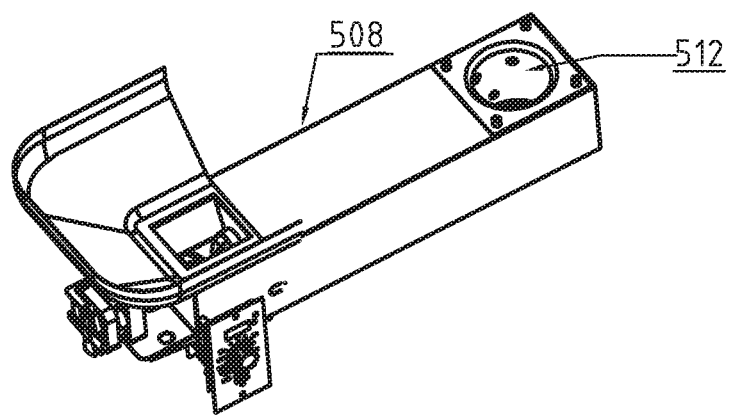

FIG. 9A and FIG. 9B are two perspective views of the embodiment of FIG. 8A and FIG. 8B, respectively, with the ceramic inner liner 514 removed to better illustrate the operational position of the hopper 503 503 (with its back wall removed to improve the clarity of the illustration), the conduit 508, and the firepot 512 positioned within/removably secured to the conduit 508, according to an embodiment of the disclosure. As illustrated, the conduit 508 may have a top surface 902 and an opposing bottom surface 904 (hidden from view in FIG. 9A and FIG. 9B) having edges that are joined by opposing sidewalls 906, and a rear wall 908 having edges that join the top surface 902, the opposing bottom surface 904, and the opposing sidewalls 906. The fan 520 may be configured at a first end of the conduit 508 (e.g., an end of the conduit 508 that would be in the space external to the ceramic oven body (not shown). The fan 520 may regulate (by control of the speed of a fan motor 534) combustion air forced into a plurality of openings 910 in a side of the firepot 512.

According to another embodiment, a ceramic pellet grill 500 may include a ceramic oven body 502 having a first through-hole 604 in in a side of the ceramic oven body 502 with a conduit 508 extending into and through the first through-hole 604 and spanning between a space external to the ceramic oven body and a space internal to the ceramic oven body. In other words, a conduit 508 extending through the first though-hole and into the ceramic oven body 502. The ceramic pellet grill 500 may include means for storing pellets. The pellets being composed of wood or another fuel in pellet form that is suitable for use with a cooking grill. In one aspect, the means for storing pellets may be a hopper 503, such as the hopper 503 of FIG. 5, or may be a box or a container suitable for storing pellets and feeding them to a means for moving the pellets within the conduit 508. According to some aspects the means for moving the pellets within the conduit 508 may include, for example, an auger 510 (e.g., a helical shaped, screw shaped, spiral shaped protrusion that forms a groove spiraling toward one end of a shank of the auger), where the auger 510, may be housed within a within a tube 511 (e.g., hollow right circular cylinder) or a trough (not shown). The tube 511 may have an inner diameter that is greater than an outer diameter of the auger 510 (e.g., to leave enough clearance to permit the auger 510 to rotate freely within the tube 511). Other devices that transport, transfer, transmit, and/or push pellets from one end of the device to an opposite end of the device are within the scope of this disclosure.

The embodiment of the ceramic pellet grill 500 may further include a firepot 512 within the conduit 508 and operationally positioned toward an end of the conduit 508 that is within (e.g., in the space internal to) the ceramic oven body 502, the firepot 512 having an open top, the firepot 512 configured to receive pellets from the means for moving the pellets.

The embodiment of the ceramic pellet grill 500 may further include means for insulating the conduit 508 from heat in the space within the ceramic oven body 502 that is above the means for insulating the conduit 508. In other words, the embodiment of the ceramic pellet grill 500 may further include means for insulating the conduit 508 from heat within the ceramic oven body that is above the means for insulating the conduit. According to some aspects, the means for insulating the conduit 508 from heat in the space within the ceramic oven body that is above the means for insulating the conduit 508 may be, for example, a ceramic inner liner 514 having a portion juxtaposed to (e.g., placed side-by-side) and covering the conduit 508 in the space internal to the ceramic oven body 502 and having a second through-hole 516 aligned with and juxtaposed to the open top of the firepot 512. The ceramic inner liner 514 may thermally insulate the conduit 508 from heat in the space within the ceramic oven body 502 that is above the ceramic inner liner 514 and below the ceramic cover 501.

Figure 11:
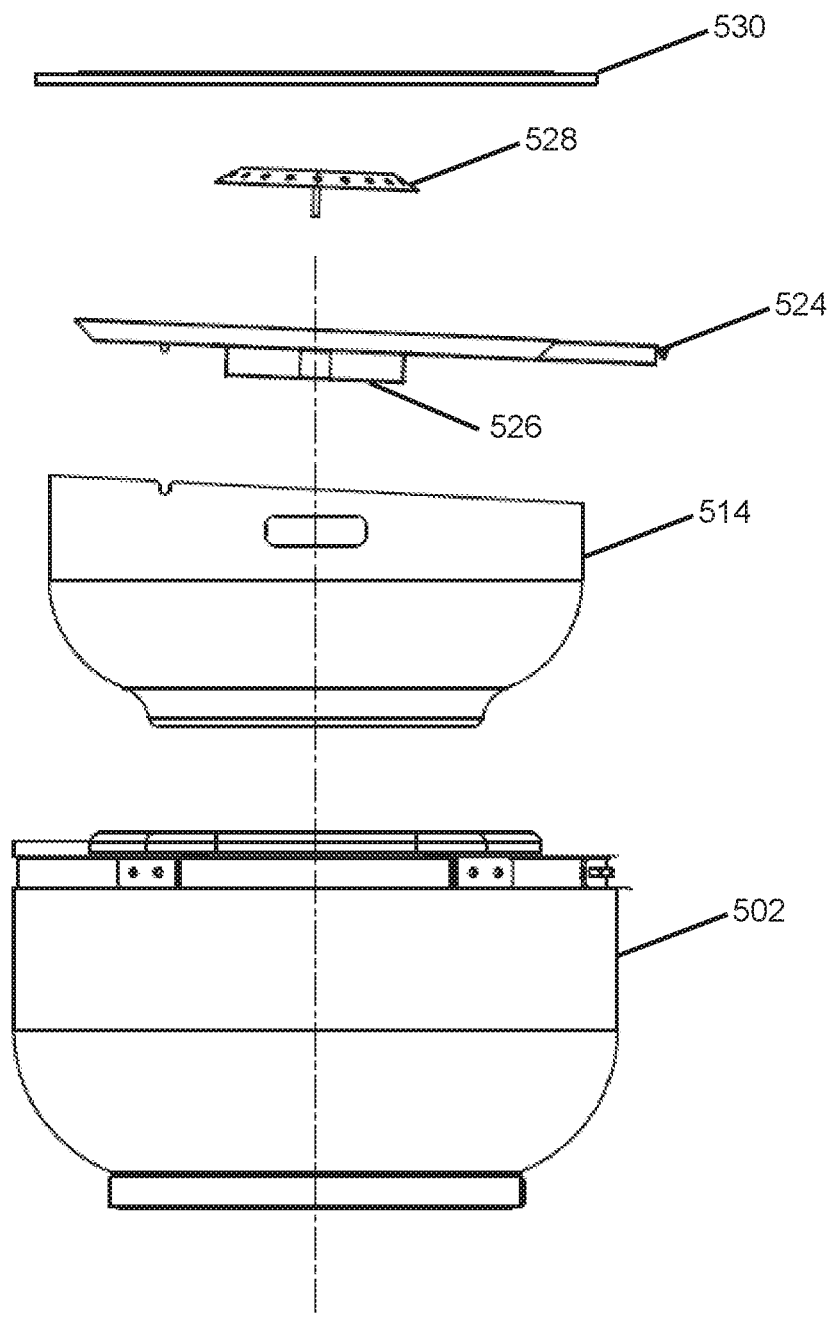
FIG. 11 is an exploded side view of a ceramic oven body, ceramic inner liner, a flame tent, a drip pan, an oil diffuser structure, and a cooking grid of the ceramic pellet grill 500 of FIG. 5.

FIG. 11 is an exploded side view of a ceramic oven body 502, ceramic inner liner 514, a flame tent 526, a drip pan 524, an oil diffuser structure 528, and a cooking grid 530 of the ceramic pellet grill 500 of FIG. 5.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

What is claimed is:

1. A ceramic pellet grill, comprising:
a ceramic oven body having a first through-hole in a side of the ceramic oven body;
a conduit inserted through the first through-hole into the ceramic oven body;
a firepot removably coupled to the conduit toward an end of the conduit that is within the ceramic oven body; and
a ceramic inner liner within the ceramic oven body, wherein the ceramic inner liner:
is configured to fit adjacent to an inner wall of the ceramic oven body, and
is provided with a bulge that covers at least a top surface of the conduit adjacent to the firepot and within the ceramic oven body and that includes a second through-hole vertically aligned with the firepot.

2. The ceramic pellet grill of claim 1, further comprising:
an auger, within the conduit, having a first end external to the ceramic oven body and a second end coupled to the firepot, the auger extending from the first end to the second end;
a hopper coupled to the first end, to store pellets and to feed the pellets to the first end of the auger;
an electric motor at the first end, coupled to the auger, to rotate the auger, wherein rotation of the auger by the electric motor conveys pellets from the hopper into the firepot via the auger; and
a built-in igniter within the firepot.

3. The ceramic pellet grill of claim 2, wherein an outer contour of the ceramic inner liner corresponds to an inner contour of an inner wall of the ceramic oven body and is releasably coupled to the inner wall of the ceramic oven body, and further comprises:
a fan configured to force combustion air from outside of the ceramic oven body into the firepot via the conduit;
a thermostatic control device in electrical communication with the electric motor coupled to the auger and the fan, configured to control combustion of the pellets in the firepot and regulate heat in the ceramic oven body above the ceramic inner liner;
a drip pan, above and distinct from the ceramic inner liner, wherein the drip pan is configured to collect drippings from food on a cooking grid above the drip pan and to distribute the drippings to a holding receptacle; and
a flame tent located below the drip pan and aligned with the firepot below the drip pan, to evenly distribute heat from flame generated by combustion of the pellets in the firepot.

4. The ceramic pellet grill of claim 2, further comprising an igniter switch, wherein the igniter switch is electrically coupled to the built-in igniter and the igniter switch is located at a lower side of the conduit outside the ceramic oven body.

5. The ceramic pellet grill of claim 1, further comprising:
a thermostatic control device;
a fan; and
an electric motor in electrical communication with the thermostatic control device and coupled to the fan,
wherein, the thermostatic control device is configured to force combustion air from outside of the ceramic oven body into the firepot via the conduit, to promote pellet combustion, by controlling a speed of the electric motor.

6. The ceramic pellet grill of claim 1, further comprising:
a ceramic oven cover that covers a top of, and couples to, the ceramic oven body, an outer edge of the ceramic oven cover configured to correspond in shape and size to an outer edge of the ceramic oven body; and
a support frame configured external to the ceramic oven body and below the outer edge of the ceramic oven body.

7. The ceramic pellet grill of claim 6, wherein a top of the support frame is about 5-8 mm below the outer edge of the ceramic oven body.

8. The ceramic pellet grill of claim 1, further comprising:
a fixture integral with and protruding from a bottom of the ceramic oven body, wherein the end of the conduit that is within the ceramic oven body is supported by the fixture to ensure that an open top of the firepot is adjacent to and aligned with the second through-hole of the ceramic inner liner.

9. The ceramic pellet grill of claim 1, wherein the inner wall of the ceramic oven body expands by about 2-3 mm at a top of the ceramic oven body to form a placement platform configured to support a cooking grid.

10. The ceramic pellet grill of claim 1, further comprising a drip pan assembly, above and distinct from the ceramic inner liner, the drip pan assembly removably seated within the ceramic oven body and configured to collect oil dripped from food cooking on a cooking grid above the drip pan assembly and prevent the oil from falling onto any surface of the ceramic inner liner below the drip pan assembly.

11. The ceramic pellet grill of claim 10, wherein the drip pan assembly comprises:
a drip pan having an outer edge juxtaposed to an inner wall of the ceramic oven body;
an opening defined by sidewalls in a floor of the drip pan; and
a flame tent below the opening and having a flame tent outer perimeter that is larger than an outer perimeter of the sidewalls defining the opening, the flame tent configured to prevent flame rising from the firepot from passing through the opening and configured to evenly distribute heat from the flame across a bottom of the drip pan assembly, and
an oil diffuser structure above the opening, the oil diffuser structure having an oil diffuser outer perimeter that is larger than the outer perimeter of the sidewalls defining the opening, the oil diffuser structure:

having a plurality of heat diffuser openings around an outer edge of the oil diffuser structure, and configured to evenly distribute heat rising from the opening across the cooking grid via the plurality of heat diffuser openings.

12. A ceramic pellet grill, comprising:
a ceramic oven body having a first through-hole in a side of the ceramic oven body;
a conduit extending through the first through-hole and into the ceramic oven body;
an auger configured within the conduit;
a firepot removably coupled to the conduit and operationally positioned toward an end of the conduit that is within the ceramic oven body, the firepot having an open top, the firepot configured to receive pellets from the auger; and
a ceramic inner liner removably seated within the ceramic oven body and having:
an outer wall immediately juxtaposed to an inner wall of the ceramic oven body,
a first portion covering at least a top surface of the conduit adjacent to the firepot and within the ceramic own body, and
a second through-hole in the first portion that is vertically aligned with the open top of the firepot,
wherein the ceramic inner liner is configured to thermally insulate the conduit within the ceramic oven body from heat that is above the ceramic inner liner.

13. The ceramic pellet grill of claim 12, further comprising:
a protruding feature, integral with and protruding from a bottom of the ceramic oven body, wherein the conduit is configured to rest on the protruding feature to ensure that the open top of the firepot is aligned with and juxtaposed to the second through-hole of the ceramic inner liner.

14. The ceramic pellet grill of claim 12, further comprising a fan at an end of the conduit external to the ceramic oven body, wherein the fan is configured to regulate combustion air forced into a plurality of openings in a side of the firepot, the fan in fluid communication with the plurality of openings via the conduit.

15. The ceramic pellet grill of claim 12, wherein the portion of the ceramic inner liner covering at least the top surface of the conduit adjacent to the firepot and within the ceramic oven body is a bulge having a shape that conforms to a shape of the conduit along a full length, width, and height of the conduit within the ceramic oven body.

16. The ceramic pellet grill of claim 12, the conduit having a top surface and an opposing bottom surface having edges that are joined by opposing sidewalls, and a rear wall having edges that join the top surface, the opposing bottom surface, and the opposing sidewalls; and
wherein the portion of the ceramic inner liner covering at least the top surface of the conduit within the ceramic oven body is immediately adjacent to and parallel with the top surface of the conduit along at least a full length of the conduit within the ceramic oven body.

17. The ceramic pellet grill of claim 16, wherein the portion of the ceramic inner liner covering at least the top surface of the conduit within the ceramic oven body have respective surfaces that are immediately adjacent to and parallel with the top surface and the opposing sidewalls of the conduit along at least the full length of the conduit within the ceramic oven body.

18. The ceramic pellet grill of claim 16, wherein the portion of the ceramic inner liner covering at least the top surface of the conduit within the ceramic oven body have respective surfaces that are immediately adjacent to and parallel with the top surface, the opposing sidewalls, and the rear wall of the conduit along at least the full length of the conduit within the ceramic oven body.

19. The ceramic pellet grill of claim 12, further comprising a drip pan assembly, above and distinct from the ceramic inner liner, the drip pan assembly removably seated within the ceramic oven body and configured to collect oil dripped from food cooking on a cooking grid above the drip pan assembly and prevent the oil from falling onto any surface of the ceramic inner liner below the drip pan assembly, wherein the drip pan assembly comprises:
a drip pan having an outer edge juxtaposed to an inner wall of the ceramic oven body;
an opening defined by sidewalls in a floor of the drip pan; and
a flame tent below the opening and having a flame tent outer perimeter that is larger than an outer perimeter of the sidewalls defining the opening, the flame tent configured to prevent flame rising from the firepot from passing through the opening and configured to evenly distribute heat from the flame across a bottom of the drip pan assembly, and
an oil diffuser structure above the opening, the oil diffuser structure having an oil diffuser outer perimeter that is larger than the outer perimeter of the sidewalls defining the opening, the oil diffuser structure:
having a plurality of heat diffuser openings around an outer edge of the oil diffuser structure, and
configured to evenly distribute heat rising from the opening across the cooking grid via the plurality of heat diffuser openings.

20. A ceramic pellet grill, comprising:
a ceramic oven body having a first through-hole in a side of the ceramic oven body;
a conduit extending through the first through-hole and into the ceramic oven body;
means for storing pellets;
means for moving the pellets within the conduit;
a firepot removably coupled to the conduit and operationally positioned toward an end of the conduit that is within the ceramic oven body, the firepot having an open top, the firepot configured to receive pellets from the means for moving the pellets; and
means for covering at least a top surface of the conduit adjacent to the firepot and within the ceramic own body that includes an opening, for passage of the firepot into the conduit, that is vertically aligned with the open top of the firepot.

\* \* \* \* \*